Aug. 29, 1967     J. R. TERRILL ET AL     3,337,947
METHOD OF JOINING ELECTRICAL CONTACTS TO ALUMINUM PARTS
Filed June 29, 1964     2 Sheets-Sheet 1
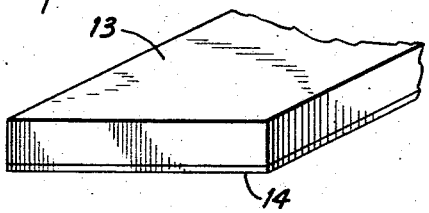
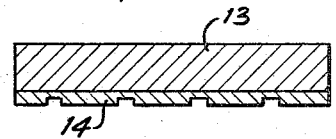
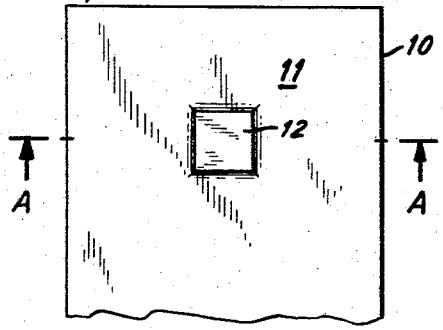
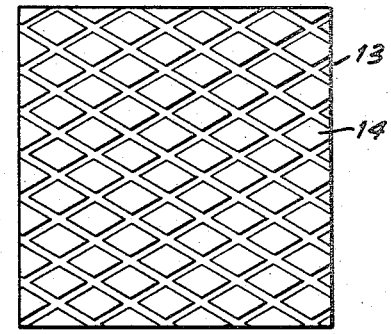
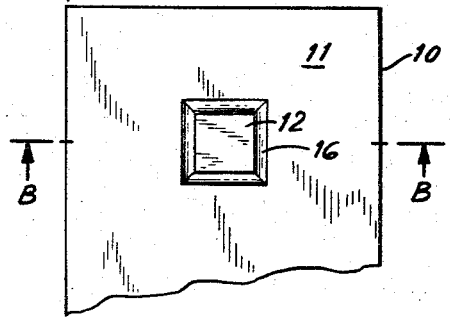
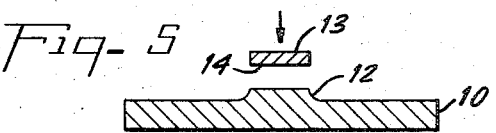
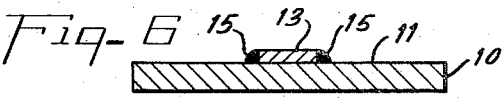
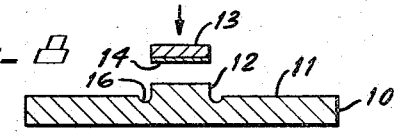
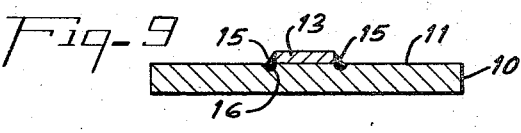
INVENTORS.
JAMES R. TERRILL
JAMES C. RICHARDS
BY
ATTORNEY

United States Patent Office 3,337,947
Patented Aug. 29, 1967

3,337,947
METHOD OF JOINING ELECTRICAL CONTACTS TO ALUMINUM PARTS
James R. Terrill, Natrona Heights, and James C. Richards, Arnold, Pa., assignors to Aluminum Company of America, Pittsburgh, Pa., a corporation of Pennsylvania
Filed June 29, 1964, Ser. No. 378,565
8 Claims. (Cl. 29—475)

This invention relates to methods of joining electrical contacts to aluminum thereby providing a commercial solution to a problem which, heretofore, has prevented substantial use of aluminum parts in circuit breakers, motor starters and like electrical devices which employ moving parts on which are mounted electrical make-and-break contacts. In the past the moving and stationary current carrying parts of such electrical devices have been usually made of copper stampings or forgings. Aluminum stampings and forgings have been readily available for such use, are inherently lower in cost per unit of conductivity and additionally, and because of lighter weight, further are capable of reducing cost by reducing gravity and inertia loads on the operating portions of such devices but, despite these advantages, aluminum parts have not found real use in such electrical devices because of the difficulty of securing a good bond between the surface of such aluminum parts and the necessary electrical contacts, whereas such contacts may be readily securely bonded to copper parts by brazing with well-known silver-containing alloys by localized heating, for example, or by heating the assembly in a furnace.

It is the principal object of this invention to provide a method by which electrical contact points having a porous surface may be so firmly joined to aluminum surfaces that the bond thus established is, in general, stronger than either the aluminum or the material of which the contact point is made, thereby establishing, for all practical purposes in the context of use, a permanent bond. The make-and-break electrical contact points, herein simply called electrical contact points, which are a necessary part of circuit breakers, switches, relays and the like are well-known articles and are often made of a pressed and sintered mixture of powdered refractory material such as tungsten, molybdenum or carbides of these metals which may or may not be mixed with powdered silver or copper, such mixtures being subsequently impregnated with more silver or copper, and when so made are generally used where high current, low cycle electrical loads are encountered. Where more moderate loads are encountered the contacts may be made from sintered powder mixtures of silver or copper with cadmium oxide or with graphite that are also impregnated with silver or copper. The methods of this invention relate only to such electrical contacts which are porous of surface, herein designated as porous electrical contacts. This, as is well known, includes all of the examples above discussed. This porous condition is a physical one rather than one related to composition and usually arises, as is well known, by reason of the compacting and sintering method by which the contacts are made. It is also possible to create a porous contact body from a non-porous one. Thus, for example, a non-porous contact body made of silver-cadmium alloy may be made porous by heating it under conditions which oxidize the cadmium. All of this is well known and forms no part of the present invention. The aluminum parts referred to herein and in the appended claims may be made of any aluminum or aluminum alloy which does not contain any great amount of constituent which melts at or below the melting point of the aluminum-silver eutectic, i.e., about 1050° F. and parts made of either aluminum and aluminum alloy of this description is herein comprehended within the term aluminum part.

The method of the invention is one of effecting the bond between the surface of an aluminum part and a surface of a porous electrical contact by forming on the surface of the aluminum part a raised portion shaped to receive a surface of the electrical contact, interposing a layer of silver between the raised portion and the porous contact, assembling the porous contact on the raised portion of the aluminum surface with the said silver layer between the porous contact and the raised portion and then applying heat and pressure to the assembly to form between the porous contact and the surface of the aluminum part molten aluminum-silver eutectic alloy which contains essentially all of the silver layer and essentially all of the aluminum of the raised portion and to force at least a major portion of this molten alloy from between the porous contact and the aluminum part to the end that a union is formed between at least a part of the surface of the porous contact and the aluminum part in substantially the plane of the surface of the aluminum part. Thus, in the method of the invention, the raised portion formed on the surface of the aluminum part disappears as well as substantially all of the silver layer. As much of the molten alloy as possible which has been thus produced is squeezed out of the interfacial region by the pressure exerted upon the electrical contact and the aluminum part and a direct contact is developed between them over a substantial portion of the interface.

If the electrical contact has a plane or flat surface, most, if not all, of the molten eutectic will be expelled from the interface but if the contact has an irregular surface, such as the common gridded type, some of the eutectic may be retained in the valleys between the elevated portions of the surface. The desired bond is established on either a flat or irregular surface wherever the aluminum member comes in direct contact with the porous surface of the electrical contact part. In some instances a very thin layer or film of eutectic may remain between the high areas on the contact part and the aluminum because of non-uniformity in the elevation of those areas or some irregularity in the aluminum surface. Where such a layer exists the strength of the bond is not as great as where a direct contact is established. In any event it is the tenacity of the bond between the two parts that determines its acceptability for service and this is conditioned by the existence of areas of direct contact between the two parts. Thus, for example, where a contact member is not dislodged under many blows delivered in approximately the plane of the surface of the aluminum member, the bond is considered to be satisfactory. In some instances the contact member may be fractured without disrupting the bond. Examination of such bonds has shown that a direct contact had been established between the parts over a substantial portion of the interfacial area.

The initial layer of silver provided between the two parts, referred to above, may be supplied in separate physical form such as a shim or powder or as a coating on the contact before it is assembled with the aluminum member. The latter arrangement is especially convenient where the porous contact body is impregnated with molten silver and some of the silver is allowed to remain on the surface which is to be ultimately joined to the aluminum member. In whatever manner the silver layer is provided it is considered to be interposed between the electrical contact and the aluminum member.

A more detached description of the method of this invention will be facilitated by reference to the accompanying drawings and photomicrographs which are here provided for that purpose and in which:

FIGURES 1, 2 and 3 are a top, cross-sectional and bottom view, respectively, of an electrical contact point embodying some preferred aspects of the invention;

FIGURE 4 is a top view of a portion of an aluminum element, such as a circuit breaker arm, the surface of which is provided with an embossed protrusion shaped to initially receive a contact point;

FIGURE 5 shows, in cross-sectional elevation, the aluminum element of FIGURE 4 sectioned as indicated at line A—A, the same being shown in association with a contact point;

FIGURE 6 illustrates in cross-sectional elevation the parts shown in FIGURE 5 after the process of this invention has been practiced;

FIGURE 7 is a top view of a portion of another aluminum element, such as a circuit breaker arm, in which the embossed projection shown in FIGURE 4 has been modified;

FIGURE 8 shows, in cross-sectional elevation, the aluminum element of FIGURE 7 sectioned, as indicated, at the line B—B, the same being shown in association with a contact point;

FIGURE 9 illustrates in cross-sectional elevation the parts shown in FIGURE 8 after the process of this invention has been practiced;

Figure 10:
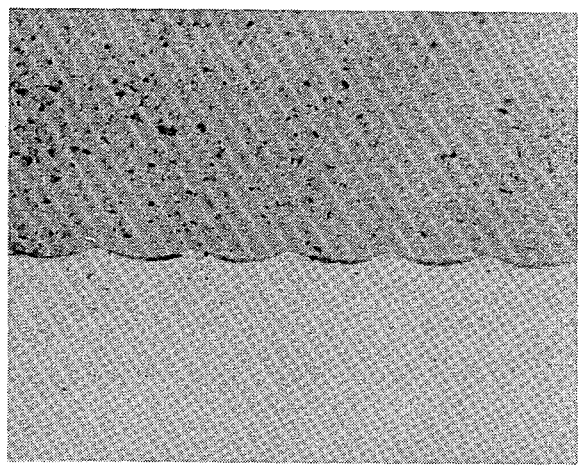
FIGURE 10 is a micrograph at 25× of the cross-section of a joint between a silver-tungsten contact having a gridded surface and an aluminum member.

In the drawings the aluminum part 10 is partially indicated only since its size or shape is of no significance to this invention and will, of course, be governed by the exact use of the part in an electrical device. Rising out of the plane of the surface 11 of the aluminum part 10 is a raised portion 12 which could be formed in various ways. Usually, for instance, the aluminum part 10 will be formed by forging or stamping and in such case the raised portion 12 may be formed by an embossing operation. If the aluminum part 10 is formed by casting, such as die casting, the raised portion 12 may be formed as a part by the casting process. Generally the cross-section of the raised portion 12, taken on a plane parallel to the plane of surface 11, will have the shape of a surface of the electrical contact 13. Thus the electrical contact 13 is shown in the drawings as a section of a cube and in consequence, the cross-section of the raised portion 12 is approximately square. The layer of silver which, prior to application of heat and pressure, is to be assembled between the electrical contact 13 and the top of the raised portion 12 may be a separate component, but since it is usually quite thin and can be conveniently provided as a coating 14 placed on that surface of the electrical contact 13 which is to be eventually bonded to surface 11 of aluminum part 10. The silver layer 14 is thus shown and indicated in the drawings. According to a common practice of the surface of contact 13 which is to be bonded to surface 11 of part 10 is gridded, as indicated in FIGURES 2 and 3. The practice of the invention is generally indicated at FIGURE 5 where the contact 13 is shown being placed on the elevated portion 12 of part 10 with the silver layer 14 between contact 13 and the top of the elevated portion 12. Heat and pressure are then applied, the pressure being applied in the directions indicated by the arrows in FIGURE 5. Usually it is convenient to apply both pressure and heat by means of electrically heated carbon blocks. The heat applied is, of course, less than that which would melt the aluminum part 10, but is more than that required to melt an aluminum-silver eutectic alloy, i.e., about 1050° F. to 1130° F. A pressure of 500 to 2000 lbs. per square inch usually suffices and a pressure of 1000 lbs. per square inch is usually quite satisfactory.

As the heat is applied the silver of layer 14 and the aluminum of the raised portion 12 form the molten aluminum-silver eutectic alloy, a large portion of which is promptly expelled by the pressure to form a bead at the edge of the contact 13. The surface of the contact 13 is pressed to about the level of the surface 11 and there bonds with that surface on at least the projections of the grid. The bead 15 may in some circumstances be left around the contact 13 or it may be removed. In a modification of the invention illustrated in FIGURES 7, 8 and 9 there is initially provided in the surface 11 of the part 10 a depressed area or moat 16 sized to form a basin to receive the molten aluminum-silver eutectic alloy as it flows outwardly under pressure. By application of a flux, such as aluminum brazing flux, a mixture of chlorides and fluorides, to promote flow of said molten alloy, the alloy will flow into the moat 16 as indicated at 15 in FIGURE 9, thus eliminating any necessity for removing it after the bonding operation is complete.

In the practice of the method of the invention it is usually desirable to provide a silver layer of a thickness of at least 0.005 inch and preferably a thickness of about 0.010 to 0.015 inch. The raised portion which is initially provided on the aluminum part to form with the silver layer and the electrical contact, in the initial assembly, should rise about 0.010 to .040 inch above the surface 11. We prefer that the embossment 12 have a rise of 0.020 to 0.030 inch above surface 11, and that its height in any event be about 2 times the thickness of the silver layer 14.

The silver layer 14 may be composed of pure silver or alloys thereof, all of which are herein comprehended by the term silver when that word is used to modify the word layer. It is however, to avoid the use of silver alloys containing metals readily volatile at the temperatures applied, such as zinc and cadmium, lest some discontinuities form in the area of the eventual bond between the electrical contact and the aluminum part.

Figure 11:
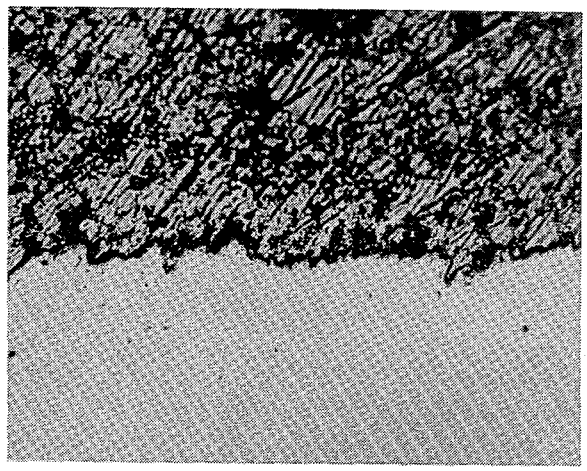
FIGURE 11 is a micrograph at 500× of the same joint showing the absence of any silver-aluminum eutectic at the interface between the aluminum member and the contact.

The appearance of part of a point near the outer edge of the interfacial area between a silver-tungsten contact having a gridded surface and an aluminum member is seen in FIG. 10 at a magnification of 25×. The upper dark portion of the figure is the silver-tungsten contact while the lower light colored portion is aluminum. The very light colored spots in some of the valleys between raised portions on the surface of the contact consist of unalloyed silver. The direct contact obtained between the electrical contact and the aluminum member is to be seen in FIG. 11 at a magnification of 500×. Here the intrusion of the aluminum into pores of the silver-tungsten contact is evident. It is this condition which establishes high strength and resistance to separation under shear stresses.

The effect upon the strength of bond between electrical contacts and aluminum members by retaining some silver and utectic at the interface and eliminating these materials is shown in the following examples. In these tests silver-molybdenum and silver-tungsten contacts were employed which were impregnated with silver and which had a silver coating over the gridded surface of about 0.012 inch in thickness. The aluminum member joined to the silver-molybdenum contacts was composed of an alloy of aluminum, 0.6% magnesium and 0.4% silicon, a composition often used for electrical conductor purposes. The aluminum member joined to the silver-tungsten contact was composed of conductor grade aluminum containing at least 99.6% of that metal. The embossment on the aluminum member had a height of about 0.025 inch. The silver faced contacts were assembled in contact with the aluminum member and the assembly compressed and heated between carbon blocks, an electrical current being passed through the blocks and assembly of sufficient magnitude to heat the assembly to the desired temperature range of about 1050 to 1130° F. A pressure of 1000 p.s.i. was applied to the assembly. To control the degree of compression of the joint for test purposes stop blocks were inserted between the carbon blocks which prevented direct contact between the electrical contact surface and the aluminum surface. In the case where direct contact was to be established, no stop blocks were used. To further control the extent of melting of the silver and formation of the eutectic, the length of time the assembly was held at temperature was varied between 15 and 30 seconds. After the joint was formed, the joined assembly was cooled to room temperature and the strength of the bond tested in shear by positioning a chisel against the contact and in a plane close to that of the surface of the aluminum member and striking the chisel with a hammer with as nearly uniform blows as possible. The number of blows were counted that either dislodged the contact or fractured it without disrupting the bond. Although such a test does not yield as precise results as a tensile test, for example, it has served to show relative differences. As a further indication of the strength of the bond which can be developed between a porous contact and an aluminum member, the performance of a silver-tungsten contact bonded to a copper member by the carbon block heating method is included in the test results given below in Table I.

alloy and that during the application of said heat and pressure the alloy is induced to flow into said depressed area.

3. The process of claim 1 characterized by the fact that the layer of silver is at least about 0.005 inch in thickness and is initially bonded to the surface of the electrical contact.

4. The process of claim 1 characterized by the fact that the height of the raised portion above the surface of the aluminum part is about 2 times the thickness of the silver layer interposed between said raised portion and said contact.

5. The process of claim 1 characterized by the fact that the portion of said aluminum part rises above the surface thereof by about 0.02 to about 0.03 inch and that said silver layer extends over the surface of said embossed portion and is about 0.010 to about 0.015 inch in thickness.

6. The process of claim 1 characterized by the fact that the pressure applied to said assembly is about 500 to 2000 lbs. per square inch.

TABLE I.—BOND STRENGTH OF JOINTS

| Type of Contact | Structural Member | Average Heating Time, sec. | Thickness of Material Between Contact and Member (inch) | | Number of Hammer Blows |
|---|---|---|---|---|---|
| | | | Ag | Ag-Al Eutectic | |
| Ag-Mo | Al-Mg-Si Alloy | 15-20 | 0.005 | 0.025 | 2-7 |
| Ag-Mo | Al-Mg-Si Alloy | 20-25 | 0 | 0.005 | 12-20 |
| Ag-W | Al | 15-20 | 0.008 | 0.013 | 1-5 |
| Ag-W | Al | 20-25 | Trace | 0.004 | 10-25 |
| Ag-W | Al | 25-30 | 0 | 0 | 30-70 |
| Ag-W | Cu | 35-45 | | | 7 |

In the two cases where silver remained in the joint, the contact member was dislodged and fell off. In the instance where some silver-aluminum eutectic remained, the contact was separated from the aluminum member but only after the silver-molybdenum or silver-tungsten member had been fragmented. In the last case where no silver or eutectic remained, the contact was not dislodged even after a great many hammer blows. The low strength of the bond between the contact and the copper member is immediately apparent.

Having thus described our invention and the preferred conditions of its operation, we claim:

1. A method of effecting a bond between the surface of an aluminum part and a porous electrical contact comprising the steps of forming on said surface of said part a raised portion shaped to receive said porous electrical contact, interposing a layer of silver between said raised portion and said contact, assembling said contact on said raised portion with said silver layer therebetween and applying heat and pressure to said assembly to form between said contact and the surface of said aluminum part molten aluminum-silver eutectic alloy containing essentially all of the silver of said layer and essentially all of the aluminum of said raised portion and to force at least a major portion of said molten alloy from between said contact and said part whereby a union is formed between abutting surfaces of said contact and said part over at least a portion of the interfacial area in substantially the plane of the surface of said part.

2. The process of claim 1 characterized by the fact that a depressed area is provided in the surface of said aluminum part adjoining the base of said raised portion said area having sufficient volume to receive the molten 7. The process of claim 1 characterized by the fact that the temperature applied to said assembly during application of pressure is about 1050 to 1130° F.

8. A method of effecting a bond between a surface of an aluminum part and a surface of a porous electrical contact of the class represented by combinations of silver with refractory metals, carbides, oxides and graphite forming on the surface of said part a raised portion having a height of about 0.02 to about 0.03 inch above said surface and a cross-section, on the plane of said surface, of approximately the shape and area of the contact surface which is to be bonded to said aluminum surface, providing said contact surface with a layer of silver of a thickness of at least 0.005 inch and pressing said coated contact surface against said raised portion under a pressure of about 500 to about 2000 lbs. per square inch and a temperature of about 1050 to about 1130° F. until the surface of said electrical contact reaches the plane of the surface of said aluminum part, whereby the silver of said layer and the aluminum of said raised portion are formed into a molten alloy which is substantially all expelled by said pressure from between said contact and said aluminum part.

References Cited

UNITED STATES PATENTS 3,026,603   3/1962   Zysk et al. _____ 29—155.55
3,034,202   5/1962   Graves _____ 29—155.55
3,083,452   4/1963   Terrill et al. _____ 29—503

JOHN F. CAMPBELL, Primary Examiner.

L. J. WESTFALL, Assistant Examiner.